No. 879,659. PATENTED FEB. 18, 1908.
A. A. LOW.
HYDROCARBON MOTOR.
APPLICATION FILED MAY 22, 1907.

Witnesses:
D. W. Gardner.
Jas. A. Wilson.

Inventor:
Abbot Augustus Low
By his Attorney
Geo. Wm. Miatt

UNITED STATES PATENT OFFICE.

ABBOT AUGUSTUS LOW, OF HORSESHOE, NEW YORK.

HYDROCARBON-MOTOR.

No. 879,659.　　　　Specification of Letters Patent.　　　　Patented Feb. 18, 1908.

Application filed May 22, 1907. Serial No. 375,009.

*To all whom it may concern:*

Be it known that I, ABBOT AUGUSTUS LOW, a citizen of the United States, residing at Horseshoe, St. Lawrence county, State of New York, have invented certain new and useful Improvements in Hydrocarbon-Motors, of which the following is a specification.

My improvements relate to hydro carbon motors, and are designed to effect the preliminary heating of vaporizing plates in the chambers in which the hydro carbon is mixed with air preparatory to its introduction into the combustion chambers.

The invention consists in the special construction and arrangement of parts hereinafter set forth.

Figure 1:
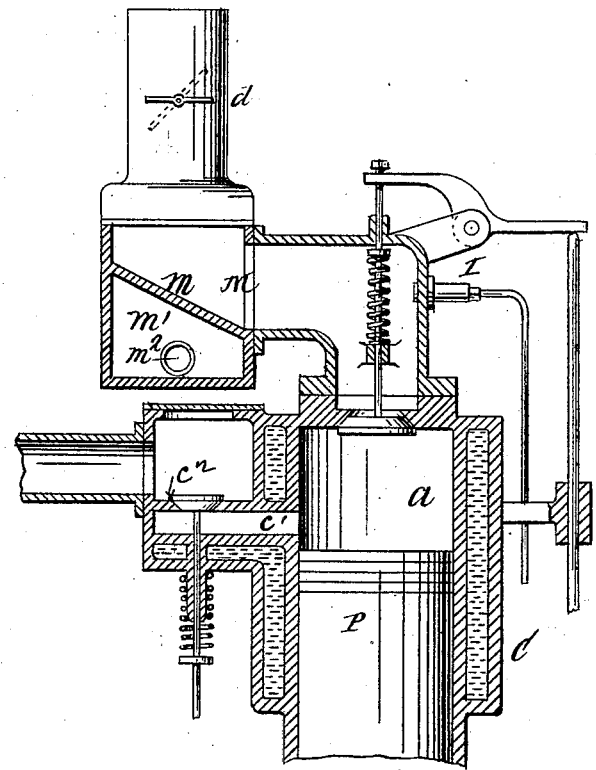
Figure 2:
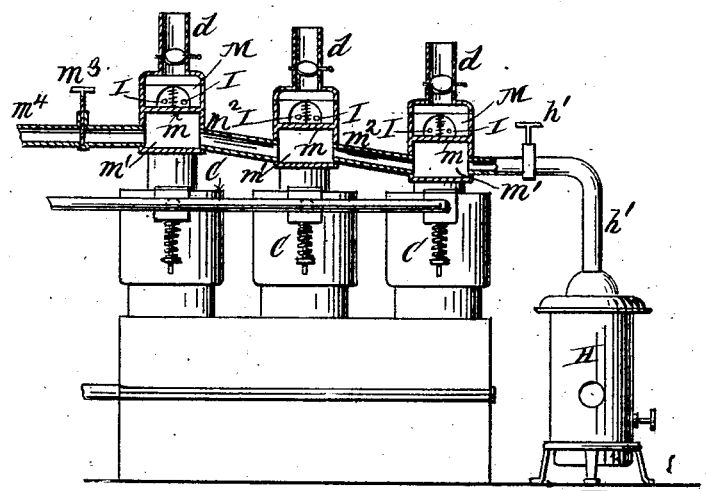

In the accompanying drawings, Figure 1, is a sectional elevation of the parts of a motor essential to an understanding of my invention; Fig. 2, a sectional elevation upon a reduced scale of a series or gang of hydro carbon motors illustrating the practical application of my invention.

The motors are of any ordinary or desired type, each of those shown in the drawings having the combustion chamber $a$, above the piston P, in the cylinder C, the products of combustion being discharged through the port $c'$, and valve $c^2$.

M is the mixing chamber into which the hydro carbon is introduced through the injectors I, to be mixed with air admitted through the conduit $d$. The liquid hydro carbon thus injected impinges against the so called vaporizing plate $m$, in the present case consisting of the inclined floor of the mixing chamber, M.

The object of the invention being to effect the preliminary heating of the mixing chamber, and particularly of the vaporizing plate $m$, I form under the latter a heating chamber $m'$, into which a heating medium is introduced from an external heating device H, of any suitable character, shown symbolically in the drawings.

Where a series or gang of motors are operated together I connect the heating chambers $m'$, successively one with the other by conduits $m^2$, as shown in Fig. 2, a damper or valve $m^3$, being inserted in the discharge conduit $m^4$, to control the flow of the heating medium. In like manner and for a like purpose, a damper $h'$, is interposed in the conduit $h$, connecting the heater H with the first heating chamber $m$.

What I claim as my invention and desire to secure by Letters Patent is,

1. A plurality of hydro carbon motors each formed with a mixing chamber and a heating chamber with a vaporizing plate interposed between them, a conduit connecting each of said heating chambers with the next in the series, an external heater arranged to introduce a heating medium into the heating chamber in the first motor, and a conduit for conveying off the heating medium from the last heating chamber of the series.

2. A plurality of hydro carbon motors each formed with a mixing chamber, and a heating chamber with a vaporizing plate interposed between them, conduits connecting each of said heating chambers with the next in the series, an external heater arranged to introduce a heating medium into the heating chamber in the first motor, a conduit for conveying off the heating medium from the last heating chamber of the series, and a damper in said conduit for regulating the escape of the heating medium.

ABBOT AUGUSTUS LOW.

Witnesses:
D. W. GARDNER,
GEO. WM. MIATT.